United States Patent [19]
Adar et al.

[11] Patent Number: 6,128,439
[45] Date of Patent: Oct. 3, 2000

[54] HOT PIPE COUPLING MEANS FOR JOINING TOGETHER TWO SEGMENTS OF PIPE

[75] Inventors: Eli Adar, Even Yehuda; Vladimir Manov, Haifa; Mark Geller, Kadima; Evgeni Sorkine, Tel Aviv; Iosef Margolin, Haifa, all of Israel

[73] Assignee: Advanced Metal Technologies, Ltd., Even Yehuda, Israel

[21] Appl. No.: 09/191,526

[22] Filed: Nov. 13, 1998

Related U.S. Application Data

[62] Division of application No. 08/650,101, May 17, 1996, Pat. No. 5,862,303.

[51] Int. Cl.[7] .............................. H05B 3/58; H05B 3/10; E03B 7/10

[52] U.S. Cl. ......................... 392/472; 219/547; 138/32

[58] Field of Search ............................... 392/472, 465; 138/32, 118; 174/47; 219/547; 148/403

[56] References Cited

FOREIGN PATENT DOCUMENTS

| | | |
|---|---|---|
| 625251 | 11/1998 | European Pat. Off. . |
| 53-40494 | 10/1978 | Japan . |
| 2036063 | 3/1992 | Russian Federation . |
| 1819223 | 8/1991 | U.S.S.R. . |
| WO 9413992 | 6/1994 | WIPO . |
| WO 9413993 | 6/1994 | WIPO . |

*Primary Examiner*—Teresa Walberg
*Assistant Examiner*—Daniel Robinson
*Attorney, Agent, or Firm*—Akin, Gump, Strauss, Hauer & Feld, L.L.P.

[57] ABSTRACT

A heating pipe including a substantially tubular, electrically insulative inner element configured to allow flow of a liquid therethrough. An electric heating element in the form of a substantially flat ribbon of overheated amorphous metallic alloy is wound in a substantially helical pattern around the inner element. The helical pattern defines adjacent, electrically insulated windings. The inner element electrically insulates the heating element from liquid in the inner element. An electrically insulative outer element is provided for electrically and thermally insulating the heating element from the surrounding ambient environment.

2 Claims, 6 Drawing Sheets

HOT PIPE COUPLING MEANS FOR JOINING TOGETHER TWO SEGMENTS OF PIPE

This is a divisional of application Ser. No. 08/650,101 filed May 17, 1996 now U.S. Pat. No. 5,862,303.

BACKGROUND OF THE INVENTION

This invention relates to pipes heated using electrical heaters, and more particularly to such pipes using a distributed flat heater made of tape or braided wire, preferably using a tape made of an amorphous alloy.

Heretofore, various devices and methods have been devised to produce pipes including electrical heater means to heat a liquid therein. The relatively high cost prevented widespread use of these pipes.

A measure of flexibility is required of heated pipes to allow installation in various locations under constraints of size and shape of available space. Heated pipes known in the art are mainly rigid and do not easily adapt to these constraints.

Other pipes known in the art do not have any provisions to heat the liquid therein, but require heat to be applied externally, if possible.

For example, Zelinka et al., U.S. Pat. No. 4,484,061, details a temperature control system for a liquid chromatographic column including a thin film heater/sensor comprising a foil-like patterned heating element adhesively mounted between a pair of flexible electrically insulative layers.

Blomquist G., U.S. Pat. No. 5,431,762, details a method of joining the ends of spirally wound thermoplastic pipes and; it comprises working the ends with stepped faces. A stainless steel band is then applied over the gap, and heated to 100 deg.C. An internal extruder is then rotated around the inside of the gap to form a thermoplastic weld which is allowed to cool before the band is removed.

Dommer A. and Dommer D., U.S. Pat. No. 5,225,030, detail an arrangement for (internally) welding the (longitudinal) joints between sections assembled to form a hollow plastic profile in which a device of heating bars and pressure pads is drawn through the assembly to weld plastic filler strips into the joints. Preferably the traction device carries opposed heating bars containing cartridge heaters and thermosensors, which plastify the joint edges of the profiles and plastics welding strips with tear-resistant cores, e.g. steel wires.

Sopory U., U.S. Pat. No. 5,432,323, details a strip heater which has one elongate control element, one elongate heating element and a number of elongate conductors. An electrical insulator partially encloses the elements and the conductors. The elements are physically separated and electrically connected by one of the conductors such that both of the elements can be simultaneously placed in relative thermal contact with an object to be heated.

Alternatively a dividing strip separates the heating element from the control element and at a fixed distance so that the heating element is maintained generally parallel to the control element.

Yurkin V., RU Patent 2036063, details a method consisting of cutting a metal strip into blanks, winding the blanks in several turns around a forming drum, welding the inner and outer seams, and butt welding the resultant shells to produce a pipe. The method is characterised by the following features: (a) the metal strip is produced by hot rolling; (b) cutting into blanks takes place immediately after the rolling process; (c) an easily melting metal in powder or strip form, with a melting point below 1100 deg.C., is applied to the drum in the winding process while the blank temp. is not below the melting point of this metal.

AMT Ltd. Patent Application 08/292685 details the use of amorphous metallic ribbon for electrical heating, and the use of the Manov process.

Olovyanishnikov V. et al., SU Patent 1819223, details a reinforced thermoplastic-pipes production method—has lengthwise steel-wire reinforcing elements applied with heating, followed by steel-tape wound helically in opposite directions and protective cover, with final heating.

Used in manufacturing of hose-like articles, e.g. flexible reinforced tubes for conveying aggressive liquids and gases in petroleum, petroleum-processing, chemical, etc. industries.

DABINETT J. and MILLWARD W., Patents WO 9413992, AU 9455729, EP 625251 and EP 625252, detail a method of producing composite pipe for use in oil, gas, water and chemical industries—has core of helically wound steel strip embedded in plastics matrix, with outer lining of glass fibre filament.

The pipe is produced on a heated rotating mandrel coated with a release agent. The inner surface may be polyester veil impregnated with epoxy resin. G.R.P. lining is wound from glass fibre filaments previously passed through a resin bath.

A steel strip is wound onto the uncured wet resin and an epoxy resin simultaneously applied. The outer lining is of glass fibre filament previously passed through a resin bath. Heat is applied whilst rotating to cure the resin. The mandrel is removed after cooling. ADVANTAGE—Improved strength, stiffness and corrosion and abrasion resistance.

Hynes U.S. Pat. No. 3,286,078 details a flexible internal heater. A flexible metal tubing contains insulated flexible resistors. The metal tubing is mounted inside a flexible hose conduit to heat liquid therein.

Manov et al., U.S. Pat. No. 5,641,421, details an amorphous metallic alloy electrical heater system.

HITACHI METALS LTD, JP 5340494, details plastic pipe coupling—using electric wire, wherein electric wire is embedded in the inner surface of a coupling body. By generating heat of the electric wire, the outer surface of a resin pipe inserted in the connection end part of the coupling body is heated and coupling body and the resin pipe are fused and connected together.

Disadvantages of these devices and methods include the relatively high cost, difficulty in flexing the pipes to adapt to installation constraints and lack of electrical heating capability in part of the abovementioned devices.

Moreover, pipes joined according to JP 5340494 have a nonuniform, rugged shape because of the uncontrolled heating process.

SUMMARY OF THE INVENTION

According to the present invention, there is provided a pipe heated using electrical heater means using a distributed flat heater made of tape or braided wire, preferably using a tape made of an amorphous alloy.

According to one aspect of the present invention, there is provided a hot pipe including an electrical heater element of a helically- wound tape made of an amorphous alloy, to achieve optimal heating of a liquid therein, due to uniform heating of the whole pipe contents.

According to a second aspect of the present invention, the heater element is enclosed between an inner and an outer layers made of an electrical insulating material, to electrically insulate the heater from the liquid inside said pipe and from the ambient surrounding said pipe, and with the whole structure providing mechanical strength and capable of withstanding liquid pressure within said pipe, together with a flexible structure.

According to a third aspect of the present invention, the outer layer is made of a thermally insulating material, to keep the heat generated by the heating element inside the pipe, and the inner layer is made of a heat conductive material, to transfer the heat to the liquid therein.

According to a fourth aspect of the present invention, the hot pipe further includes heat sensitive means connected to electrical power switching means such as to connect the electrical power to the heater element when the temperature inside the pipe is below a preset value, and to turn off the electrical power when the temperature exceeds that value. Optional sensor enables heating only when pipe is filled with liquid like water.

According to a fifth aspect of the present invention, the hot pipe further includes rigid ends with optional threads to connect to other, existing pipes, and electrical terminals to allow easy connection to the heating element in the hot pipe.

According to a sixth aspect of the present invention, an apparatus for continuous production of a hot pipe is detailed.

According to a seventh aspect of the present invention, a device for joining together segments of plastic pipe is detailed. A coupling body includes a distributed flat heater, preferably made of an amorphous alloy. The amorphic alloy has a crystallization temperature corresponding to the optimal temperature for the plastic the pipes and coupling are made of, thus ensuring uniform heating of the joining area, at the optimal temperature, and the disappearence of the heater.

Further objects, advantages and other features of the present invention will become obvious to those skilled in the art upon reading the disclosure set forth hereinafter.

DESCRIPTION OF THE PREFERRED EMBODIMENTS

A preferred embodiment of the present invention will now be described by way of example and with reference to the accompanying drawings.

Figure 1:
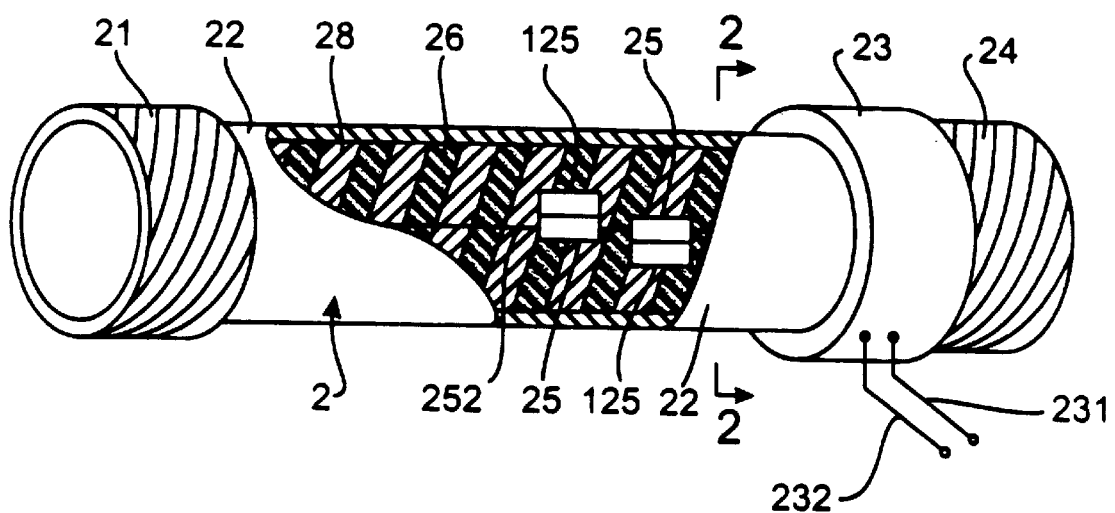
FIG. 1 is a perspective view of the hot pipe, shown partially broken away.

Referring to FIG. 1, an example of a hot pipe according to the present invention, hot pipe 2 includes an inner layer means 28 of an electrically insulating but thermally conductive material means, for example a thin layer of PVC. A thin stripe of amorphous metallic alloy means 26 is wound on layer 28 to form a helically-shaped electrical heating element. Stripe 26 is wound such as to leave a gap between adjacent windings, to keep them electrically insulated from each other; thus, electrical current can only flow along stripe 26 on a helical path, to achieve a relatively long path with a relatively high electrical resistance as required to generate the desired electrical power to be converted into heat power. Insulating layer means 28 keeps the liquid inside pipe 2 insulated from the electrical voltage being applied to stripe 26, while transferring the heat generated in stripe 26 to said liquid.

Stripe 26 is made of amorphous metallic alloy which provides for low cost production of thin metallic tapes, which are suitable as electrical heater means. The stripes are preferably made using the process detailed by Manov et al., including the steps of overheating the melted alloy to a precise temperature prior to rapid quenching, to achieve reliable ribbons with reproducible characteristics. Other flat heater means may be used.

Pipe 2 also includes an outer insulating layer means 22 made of a flexible material. Thus the whole pipe is flexible and can adapt to various shapes as required in practical installation situations, whereas the multilayer structure, reinforced with metallic stripe 26 provides the capability to withstand the high pressure of the liquid within pipe 2.

Outer layer 22 is made of a thermal insulating material so as to keep the heat generated in stripe 26 inside pipe 2, and not to waste the heat on the surroundings. Layer 22 also provides mechanical protection for wires 252 and thermocouple means 25 which are mounted along pipe 2; wires 252 and thermocouple means 25 are coated with an insulating layer (not shown) to keep them electrically insulated from stripe 26, with thermocouple means 25 mounted close to inner layer 28 so as to measure the true temperature inside hot pipe 2.

Wires 252 and thermocouple means 25 may be attached to pipe 2 on a zig-zag pattern (not shown) to provide pipe 2 with a greater measure of flexibility.

To connect stripe 26 to electrical power generating means, wires have to be connected to each side of stripe 26; for a long pipe 2, this may be inconvenient. Thus, a structure is shown in FIG. 1 wherein the left side of stripe 26 is connected to wire 252 which runs along the length of pipe 2 back to the right side of pipe 2, thus allowing to connect the left side of stripe 26 to the terminal wire means 232; accordingly, the second terminal wire means 231 is connected to the right side end of stripe 26.

To achieve a desired temperature inside pipe 2, it is not enough to connect a predefined voltage to stripe 26 of predefined electrical resistance; the actual temperature inside pipe 2 depends on the rate of flow of the liquid inside the pipe and on its thermal characteristics (i.e. specific heat). Occasionally there may be no liquid inside pipe 2 (for example if the pipe is damaged and liquid flows out); in such a case a rapid temperature increase is expected, since there is no liquid to cool stripe 26.

Accordingly, to achieve the desired temperature inside pipe 2, thermocouple means 25 are distributed along pipe 2 and are electrically connected in series to each other and between stripe 26 and the electrical power mains. If the temperature is below the preset value (the value at which thermocouples 25 make contact), then electrical power is applied to stripe 26 which heats up; when at least one thermocouple reaches the desired temperature, it disconnects the electrical power from stripe 26. Thus, automatic temperature control is achieved to keep the temperature of the liquid inside pipe 2 at the desired value.

In the present invention, an amorphous metallic alloy is used for stripe 26; since these alloys are only capable of operation at low temperatures, below the embrittlement value, the thermocouples are set to a temperature well below this value. Accordingly, insulating layers 22, 26 and 28 can be made of low cost materials, which are only capable of withstanding these low temperatures, to achieve a low cost hot pipe.

To allow hot pipe 2 connection to existing pipes, rigid end means 21 and 24 are attached to the left and right ends of pipe 2, respectively. End means 21 and 24 are preferably threaded for fast and easy coupling. An optional additional rigid ring means 23 is attached to one side of pipe 2, to which electrical terminals 231 and 232 are connected, this providing the required mechanical strength for reliable operation.

Other embodiments are possible, for example the thermocouples (which use mechanical contact means) may be replaced by solid state switches (not shown), each incorporating a solid state temperature sensor and a solid state switch like an SCR or a triac. The solid state sensor may include, for example, the AD590 two-terminal temperature transducer manufactured by Analog Devices Inc., which provides a linear current output in a wide range of −55 to +150° C. This device can be connected to the gate of a triac to achieve the desired switching function.

Solid state sensors are very reliable, since they do not use mechanical contacts with their inherent mechanical wear. Moreover, a precise switching temperature can be preset, which can also include a low value, for example about +4° C. This can prevent water from freezing in pipes during the winter, while saving electrical power by keeping the temperature just above freezing point. This specific temperature is also preferred by keeping the water at their lowest volume, based on the water special expansion characteristics.

In still another implementation (not shown), distributed sensors are mounted along pipe 2 and are connected to switch means inside rigid ring 23, which controls the electrical power to stripe 26.

For short pipes, there is no need for terminals 231, 232 to exit from the same side of pipe 2; each terminal wire may be connected to one side of stripe 26 and exit from that side of pipe 2; in this case, only one temperature sensor may be used, preferably mounted inside one of the rigid ends 21 or 24, preferably together with electrical switching means. This structure is recommended for supplying hot water in the bathroom, for example. A short hot pipe can be used, which provides hot water at the preset temperature while stripe 26 is connected to electrical power means. Hot pipe 2 is connected between (not shown) the cold water supply pipe and the hot water outlet.

Optional sensors 125 distributed along pipe 2 sense the presence of a liquid in pipe 2, and enable heating only when pipe is filled with liquid like water. The sensors may include capacitive sensors as known in the art, or ultrasonic or optical sensors. The liquid detecting sensors may be integrated each with a thermocouple 25, such that electrical power is switched on if both conditions are met, that is first the temperature is below the set threshold and second, there is liquid in the pipe.

While using pipes of standard length with temperature sensing and electrical switching means contained therein, the maximal power deliverable to the pipe may be limited by the structure of the pipe. If a higher power is required, for example to heat water flowing at a high rate (large volume per sectional area per second) at a high temperature differential, then several such pipes can be stacked, that is connected in series. Each pipe then achieves a smaller incremental temperature increase of the water flowing therein, with the final pipe achieving the preset, desired temperature.

Figure 2:
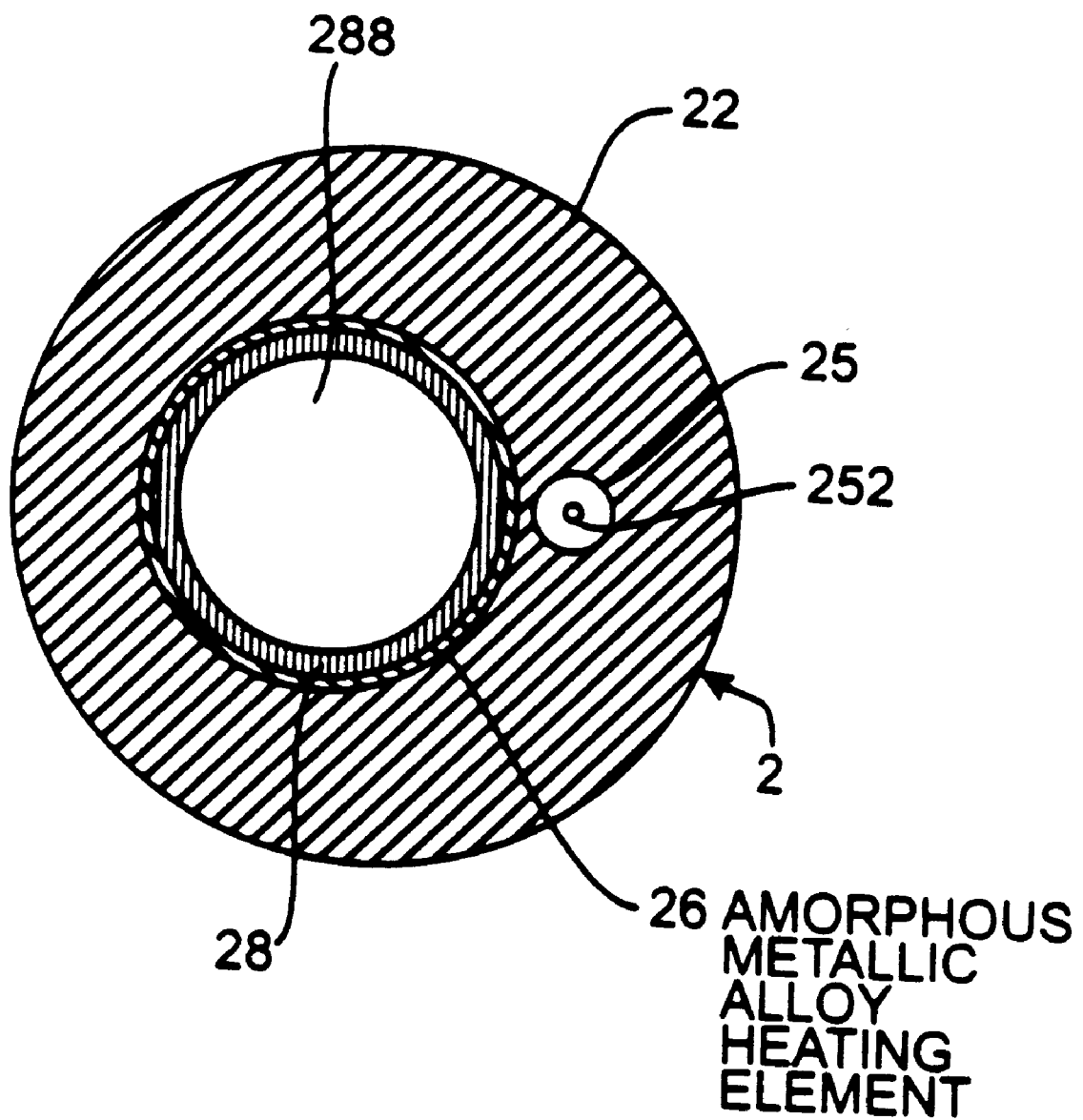
FIG. 2 is a cross-sectional view of the hot pipe, taken along line 2—2 in FIG. 1.

Referring to FIG. 2, a cross-sectional view of hot pipe 2 taken along line 2—2 in FIG. 1, hot pipe 2 includes an inner layer 28 of an electrically insulating material, forming inner passage 288 for transferring liquids therein.

A thin stripe of amorphous metallic alloy 26 is wound on layer 28; wires 252 and thermocouple means 25 are mounted close to stripe 26 to measure its temperature, coated with an insulating layer (not shown). Outer layer 22 provides electrical insulation and mechanical protection for wires 252 and thermocouple means 25, together with thermal insulation for hot pipe 2. Layer 22 may be made of a flexible plastic foam as known in the art.

Figure 3:
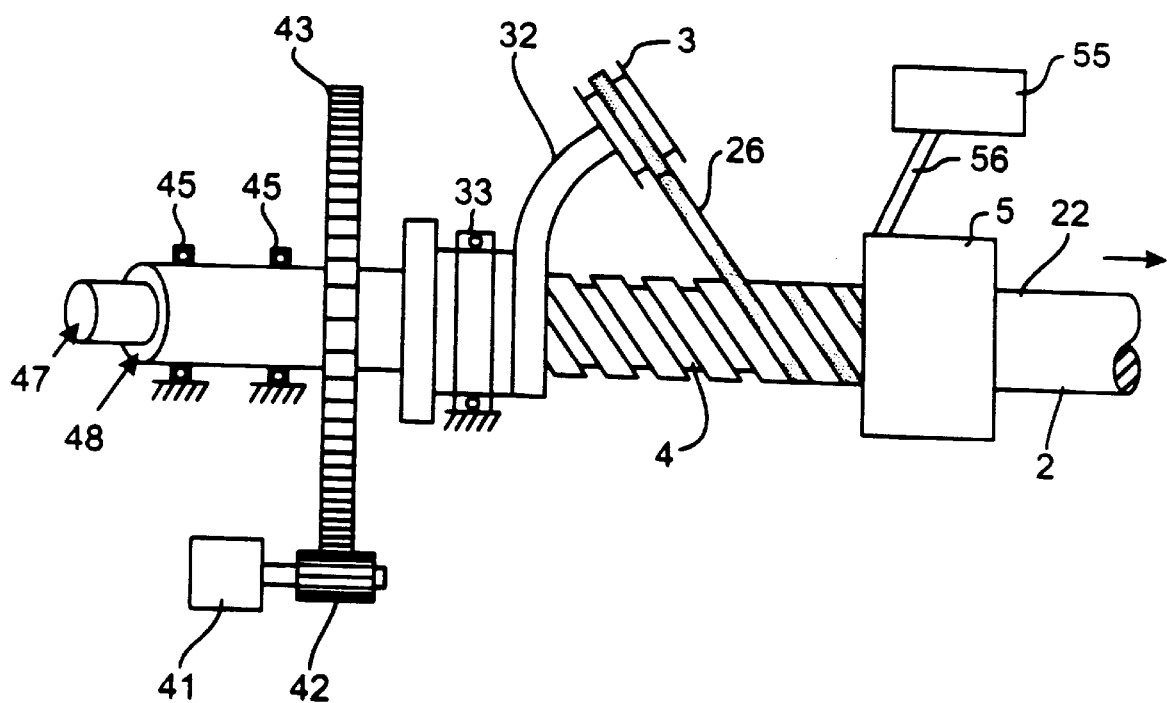
FIG. 3 illustrates an apparatus for hot pipe production.

FIG. 3 details the apparatus for hot pipe 2 production.

A thin metallic stripe 26 which is to form the electrical heater means in the pipe is dispensed from roll means 3 onto threaded rod means 4. Rod 4 is rotated by electrical motor 41 with coupled toothed gears 42 and 43 being fixed to motor 41 and rod 4 respectively to transfer the rotational motion. Alternately, other similar means for generating rotary power may be used to rotate rod 4. The metallic stripe 26 is made of thin metallic tape or braided wire; the preferred structure is a tape made of an amorphous alloy.

Roll 3 is attached to arm 32, such as to allow its rotation to release stripe 26 which is wrapped around rod 4 as the segment of stripe 26 already wound on rod 4 moves rightwards. Arm 32 is fixed in place to keep roll 3 at a fixed location relative to rod 4. Similar dispensing means may be used.

The segment of stripe 26 wound on rod 4 is pushed rightward by the rotation of threaded rod 4. Thus, a helically shaped segment of stripe 26 is formed on rod 4, which segment moves continuously to the right.

Ball bearings 45 and 33, which are attached to a fixed base, hold rod 4 in place while allowing its rotation as detailed above.

As helically shaped stripe 26 moves to the right, it enters disa 5, which is a funnel means wherein insulating layer 22 is formed around stripe 26. Layer 22 may be made of TFE or PVC or other plastic material. Originally the raw plastic material for layer 22 is stored in dispenser 55, and is supplied through pipe 56 to be applied on and around stripe 26. As stripe 26 advances to the right, it is coated with layer 22 which solidifies fast or instantaneously, to form a circular tubular layer covering stripe 26. A combination of mechanical pressure and/or heat and/or adhesive and/or ultrasound may be used to attach layer 22 to stripe 26, to form a sealed tubular layer around helically- shaped stripe 26. At this stage, stripe 26 with layer 22 surrounding it and moving rightwards reaches the end of rod 4.

Wires 252 and thermocouple means 25 (not shown here) are also attached to pipe 2 in disa 5, or may be attached at a later stage.

Rod 4 is hollow, including two concentric pipes, with one pipe transferring air under pressure and the other transferring a plastic material in liquid form, which are inserted in the left side of rod 4, through openings 47 and 48 respectively. A nozzle (not shown) in the right end of rod 4 sprays a thin cover on the inner surface of the pipe, to form the inner insulating layer (not shown).

Thus a hot pipe is formed in a continuous process wherein rotating rod 4 is continually covered with metallic stripe 26 to form a helically- shaped segment which is pushed rightwards, is covered with outer insulating layer 22 and with inner layer of plastic applied by spraying, with hot pipe 2 continuously emerging out to the right.

The hot pipe thus formed can be offered to end users, which may add electrical connections to the ends of metallic stripe 26 and the required temperature sensor and controller during the installation process.

To form a complete hot pipe as detailed in FIGS. 1 and 2, a final production stage would include (not shown in FIG. 3) the addition of thermocouples 25 or other temperature sensor means and electric switching means, applying a protective cover means and/or an additional insulating layer means and attaching the rigid fitting ends.

Figure 4:
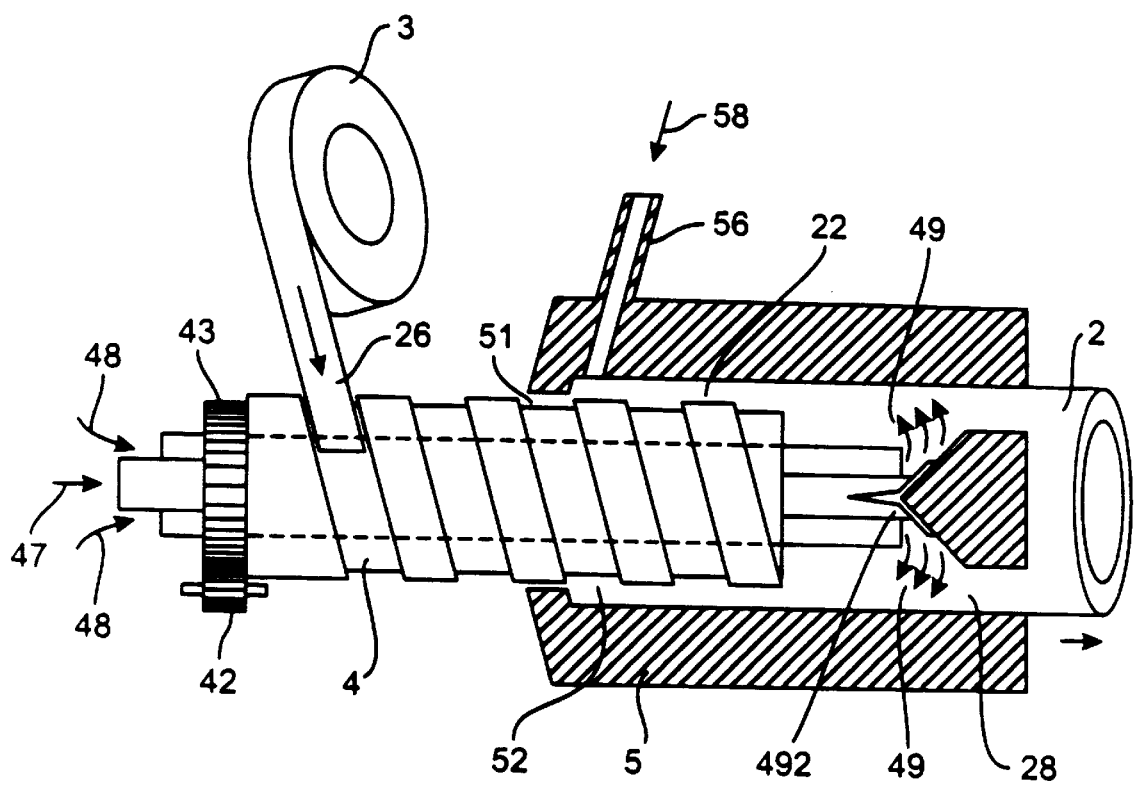
FIG. 4 details the application of the insulating layers during the hot pipe production process.

Referring to FIG. 4, a partial cross-sectional view along rod 4 which details the application of the insulating layers during the hot pipe production process, external layer 22 is applied over stripe 26 in disa 5. FIG. 4 includes only part of the components shown in FIG. 3, for the sake of clarity. The finished hot pipe 2 continuously emerges from the right side of the apparatus, from disa 5. Disa 5 is a funnel means for applying a liquid layer of plastic around metal stripe 26. Plastic material 58 for external cover 22 is applied through pipe 56. The left size opening 51 is narrow, to keep material 58 within cavity 52 having a larger diameter.

Rod 4 is rotated through coupled toothed gears 42 and 43, as metallic stripe 26 is wound on rod 4 while being dispensed from roll 3. Material 58 applied in cavity 52 around stripe 26 cools down and solidifies as it moves right, to form a solid insulating layer around metallic conductive stripe 26.

Two concentric pipes contained within hollow rod 4 are transferring air or a pressurized gas and a plastic material in liquid form which are inserted in the left side of rod 4, through openings 47 and 48 respectively. Nozzle means 492 in the right end of rod 4 create a spray 49 which forms a thin cover on the inner surface of the pipe, to form an inner insulating layer 28. Thus, pipe 2 emerging from the right side of disa 5 includes a metallic stripe 5 between an inner insulating layer 28 and an outer insulating layer 22.

Other methods can be used (not shown) to form hot pipe 2, for example inner insulation layer 28 may be applied as a tape being wound on rod 4 with an overlapping area, to form a complete pipe on which metallic stripe 26 is next wound. Likewise, external insulating layer 22 may also be applied as a tape wound around the pipe previously formed, to form the complete hot pipe 2 comprising metallic stripe 26 helically- shaped and surrounded by inner insulation layer 28 and outer insulation layer 22. Means as detailed above may be used to reliably bond the layers together to form hot pipe 2.

Figure 5:
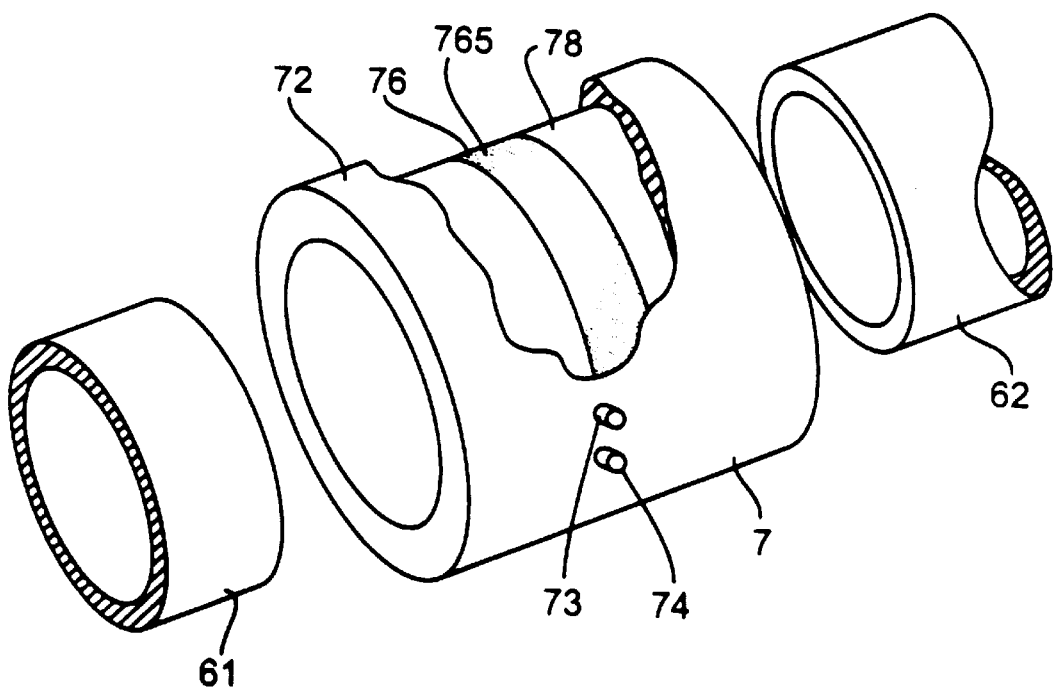
FIG. 5 details a coupling device for joining plastic pipes by applying controlled heat.

FIG. 5 details a coupling means 7 for Joining plastic pipes 61, 62 by applying heat at a controlled temperature. To join pipes 61 with 62, one end of each pipe is inserted into coupling device 7 such that the ends of the pipes meet halfway and under electrical heater means 76. Pipes 61, 62 and coupling 7 are made of polyethylene, polypropylene, PVC or a similar material. Device 7 is itself a hot pipe, devised for this purpose.

Coupling device 7 includes a distributed flat heater means 76, preferably made of an amorphous alloy, which heats device 7 and the ends of pipes 61, 62 when heater is supplied with electrical power. The amorphic alloy has a crystallization temperature corresponding to the optimal temperature for the plastic the pipes 61, 62 and coupling 7 are made of, thus ensuring uniform heating of the joining area, at the optimal temperature, and the disappearence of heater 76 which transforms into small crystalline flakes.

This is clearly superior to the presently used method, wherein a thin wire heats to a high temperature, thus transforming all the surrounding plastic to liquid. Then there is no more mechanical support for the wire, which changes shape, this being further prompted by the mechanical expansion of the plastic being heated, about 30%. The metallic wire has a much lower expansion coefficient than the plastic, this creating mechanical stress and/or liquid plastic flow around the wire. Parts of the wire come into contact, thus creating short circuits and resulting in nonuniform heating. Likewise, during cooling there is different contraction of the plastic and the wire. These uncontrolled effects result in a rugged, nonuniform shape of the joined pipes.

In the present invention, however, there is uniform heating of a large area around element 76. The temperature is controlled by the inherent crystallization temperature of the amorphous alloy element 76 is made of; when element 76, coupling 7 and the ends of pipes 61 and 62 reach that temperature, then element 76 practically disappears, thus allowing uniform expansion and contraction of the plastic joint. The crystallization temperature of element 76, which is determined during its manufacture, is set to the optimal value for reliable welding of pipes 61, 62, based on the type of plastic these pipes are made of, to achieve optimal viscosity. The crystallization temperature is determined by the composition of the amorphous alloy. For practical purposes, a crystallization temperature of between 100+200° C. is recommended.

An amorphous alloy to achieve that temperature will include, for example:

Al—La—Si or

Fe—B—Si or a similar alloy as known in the art.

Heating element 76 has a plurality of holes 765 such as to increase its electrical resistance, to allow a single winding of conducting surface around the perimeter of coupling device 7, between inner insulating layer 78 and outer insulating layer 72. This allows a wide heater structure. The ends of element 76 are connected to electrical terminals 73, 74 respectively, to allow the application of electrical power from the outside during said pipes welding. Inner insulating layer 78 is optional, since heating element 76 is used only once, and then it comes into contact only with the pipes 61, 62 being joined, not with a fluid flowing therein.

Figure 6:
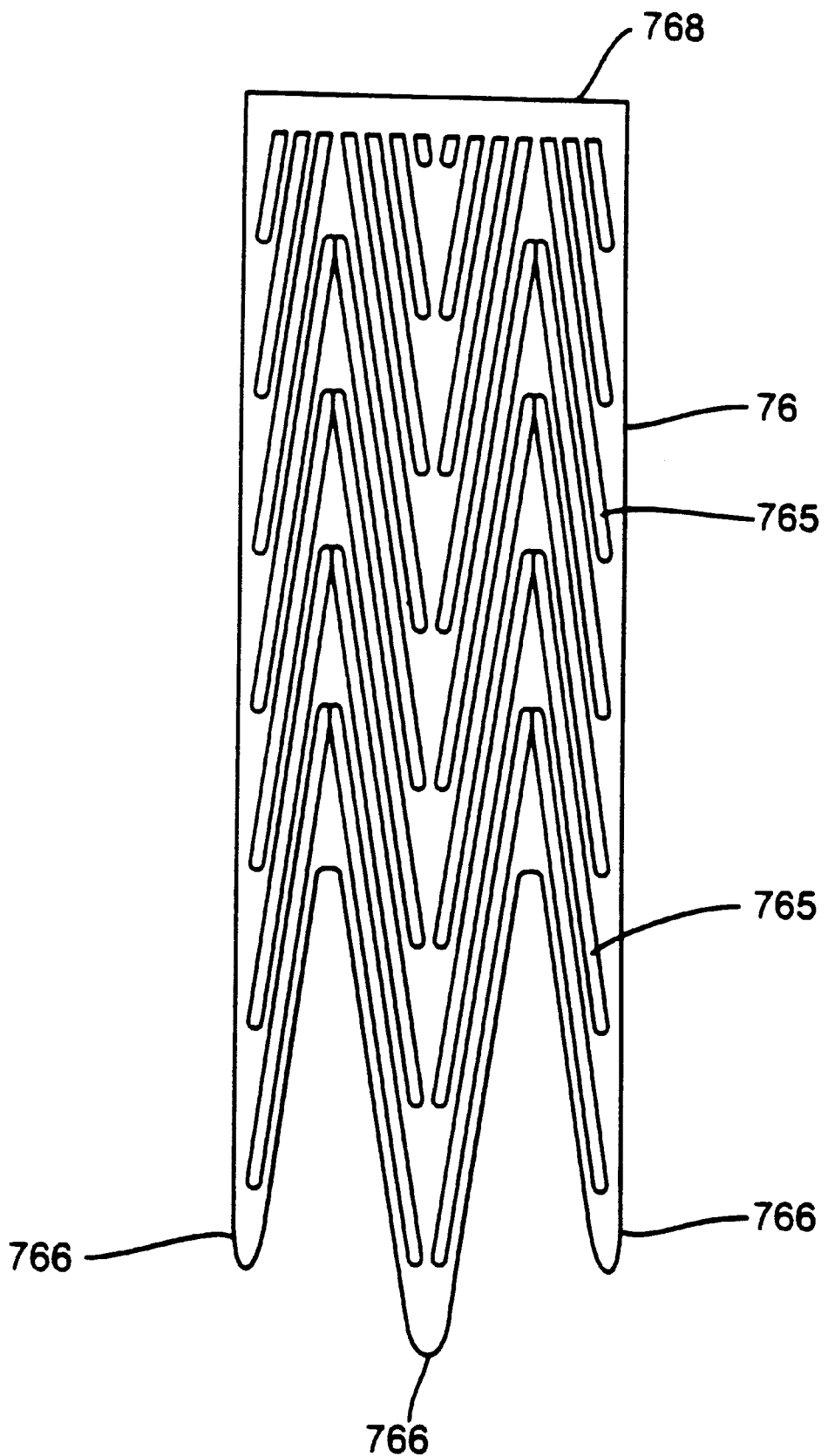
FIG. 6 illustrates a preferred structure of the electrical heating element for the coupling device.

FIG. 6 illustrates a preferred structure of the electrical heating element 76 for the coupling device 7, with a preferred structure of holes 765. Holes 765 are such oriented as to increase the electrical resistance and to provide for more or less uniform current distribution and heating of the surface of element 76. A long ribbon can be broken into the desired length segments, with electrical terminals being subsequently connected to the ends 766 thus formed. A preferred embodiment has element 76 having runs of holed areas interspersed with solid runs 768 without holes, with the ribbon being cut into pieces on these areas without holes 768. This offers the advantage of better electrical contact between element 76 and terminal, and more uniform current division (coupling into narrow areas 766 can also result in overheating there).

It will be recognized that the foregoing is but one example of an apparatus and method within the scope of the present invention and that various modifications will occur to those skilled in the art upon reading the disclosure set forth hereinbefore.

What is claimed is:

1. Hot pipe coupling means for joining together two segments of pipe, comprising:
   (A) a distributed flat heater made of an amorphous alloy having a crystallization temperature corresponding to the optimal temperature for joining the plastic said pipes and said coupling are made of, to ensure uniform heating of the joining area to said temperature and the disappearence of said heater during the joining process; and
   (B) outer isolating layer means for protecting and mechanically holding said heater, and further including electrical terminal means connected to the ends of said heater to allow electrical power connection to said heater.

2. Hot pipe coupling means according to claim 1, wherein said heater further includes holes to allow electrical current flow only through part of the surface of said heater while said current generates heat generally uniformly across said surface of said heater.

* * * * *